United States Patent [19]

Capelle

[11] Patent Number: 5,068,069
[45] Date of Patent: Nov. 26, 1991

[54] METHOD OF MAINTAINING THE FORCE OF A STRIPPER BLADE ON AN EXTRUDER FEED ROLLER CONSTANT AND AN APPARATUS THEREFOR

[75] Inventor: Gerd Capelle, Langenbagen, Fed. Rep. of Germany

[73] Assignee: Hermann Berstorff Maschinenbau GmbH, Hanover, Fed. Rep. of Germany

[21] Appl. No.: 599,513

[22] Filed: Oct. 18, 1990

[30] Foreign Application Priority Data

Oct. 18, 1989 [DE] Fed. Rep. of Germany ....... 3934734

[51] Int. Cl.[5] ............................................. B29C 47/92
[52] U.S. Cl. .................. 264/40.5; 264/40.7; 264/211.21; 425/3; 425/170; 425/146; 425/149; 425/188; 425/208; 425/376.1
[58] Field of Search ................ 264/40.5, 40.7, 175, 264/40.4, 211.21; 425/149, 3, 147, 188, 376.1, 200, 204, 205, 208, 146, 170

[56] References Cited

U.S. PATENT DOCUMENTS

| 2,054,114 | 9/1936 | Abrams et al. | 264/175 |
| 2,364,248 | 12/1944 | Spencer | 264/175 |
| 2,875,469 | 3/1959 | Davis | 425/376.1 |
| 3,712,773 | 1/1973 | Baumgarten | 425/376.1 |
| 3,858,857 | 1/1975 | Ulm | 425/145 |
| 4,247,272 | 1/1981 | Anders | 425/147 |
| 4,286,882 | 9/1981 | Schiesser | 264/40.7 |

FOREIGN PATENT DOCUMENTS

| 1031922 | 6/1958 | Fed. Rep. of Germany | 425/200 |
| 575567 | 4/1958 | Italy | 425/3 |
| 42-5091 | 3/1967 | Japan | 425/208 |
| 960575 | 6/1964 | United Kingdom . | |

Primary Examiner—Jeffrey Thurlow
Attorney, Agent, or Firm—Foley & Lardner

[57] ABSTRACT

In an extrusion device of the type which has a screw rotating in a housing and which has a feed section in which a feed roller, cooperating with the screw, is provided, a stripper blade is used to remove the fed material from the feed roller. The present invention provides a method and an apparatus for maintaining the net force acting on the stripper blade to direct it towards the feed roller constant. To achieve this, the force of the fed material which acts in a direction tending to move the feed roller and the extrusion screw apart is measured. An opposing force is applied to the stripper blade in dependence upon the magnitude of the measured force. By so doing, the net force directing the stripper blade towards the feed roller is maintained constant.

10 Claims, 4 Drawing Sheets

METHOD OF MAINTAINING THE FORCE OF A STRIPPER BLADE ON AN EXTRUDER FEED ROLLER CONSTANT AND AN APPARATUS THEREFOR

FIELD OF THE INVENTION

The present invention relates to a method of maintaining the force of a stripper blade on an extruder feed roller constant and to an apparatus therefor. More particularly, the present invention relates to a method of maintaining the force of a stripper blade on an extruder feed roller constant in an extruder which is used for extruding rubber or thermoplastics material, wherein the extruder includes an extruder screw with which the feed roller cooperates, the feed roller being located in the feed section of the extruder. The present invention relates to an apparatus suitable for achieving this.

BACKGROUND OF THE INVENTION AND PRIOR ART DISCUSSION

An extruder suitable for processing rubber of this general type is disclosed in British Patent Specification No. 960 575. This extruder comprises a feed roller which cooperates with the screw of the extruder in order to achieve a satisfactory supply of strips or pieces of rubber into the extruder.

During the feed operation, rubber adheres to the smooth external surface of the feed roller. The feed roller is, in this known arrangement, driven at substantially the same circumferential speed as the screw. In order to ensure that the rubber adhering to the feed roller remains in the feed section, a stripper blade is used. This is directed against the surface of the feed roller over its entire length and is spaced therefrom by a pre-set gap of from 0.05 to 0.1 mm.

The stripper blade only removes rubber efficiently from the feed roller surface when the point of the stripper blade is not worn, that is to say when the dimension of the gap between the roller and the blade can be maintained constant. If wear phenomena become apparent in the point region of the blade, it is necessary for the blade to be readjusted or replaced. Since the stripper blade is disposed in the extruder housing, considerable difficulties arise if the stripper blade needs to be readjusted.

If the stripper blade is inadequately adjusted relative to the surface of the feeding roller, rubber emerges from the extruder at the end thereof where the feed roller is disposed. In the case of an extruder having a screw diameter of 300 mm and a feed roller having a diameter of 400 mm, up to 100 kg of rubber per hour may emerge from the extruder at the feed roller end in this manner. In consequence, in order to avoid these rubber losses, it is necessary for an operator to readjust the stripper blade very frequently and this must be effected manually.

Since the feeding of the strips or pieces of rubber produces constantly changing separation forces between the screw and the feed roller, the pressure of the rubber acting on the stripper blade, is also constantly changing.

If the operator sets the gap between the stripper blade and the feed roller surface too small, the pressure of the rubber in the feed section increases still further and the pressure on the stripper blade becomes disproportionately high. This phenomenon causes wear of the stripper blade to increase considerably.

OBJECTS OF THE INVENTION

The present invention seeks to provide a method and an apparatus which overcome the above-described disadvantages. In particular, the present invention seeks to provide a method in which the wear on the blade and the loss of rubber mixture is eliminated or at least minimized, even though the separation forces occurring between the screw and the feed roller are constantly changing.

SUMMARY OF THE INVENTION

According to the present invention, there is provided in an extrusion device comprising a barrel and an extrusion screw mounted for rotation within said barrel, said barrel defining a feed section into which material to be extruded is fed, said feed section comprising receiver means pivotally connected to said barrel and communicating therewith; feed roller means mounted for rotation within said receiver means, stripper blade means directed towards but spaced from said feed roller means for removing said material from said feed roller and for directing said material into said barrel for extrusion by said screw, said feed roller means cooperating with said extruder screw, and means for measuring the pressure exerted in said barrel by said feed material, a method of maintaining constant the force with which said stripper blade is directed towards said feed roller, means comprising the steps of measuring the force generated by said fed material tending to force said screw away from said feed roller means and applying a force to said stripper blade in dependence upon said measured values of the force value such that the net force directing said stripper blade towards said feed roller means remains constant.

Also according to the present invention, there is provided an extrusion device comprising a housing; screw means mounted for rotation within said housing, said housing defining a feed section into which material to be extruded is fed; said feed section comprising receiver means pivotally connected to said housing and communicating therewith; feed roller means mounted for rotation within said receiver means; said feed roller means cooperating with said screw; stripper blade means directed towards said feed roller means but spaced therefrom for removing said material from said feed roller means and for directing said material into said housing, and means for measuring the force exerted by said fed material within said housing, said means comprising at least one tension rod connecting said receiver means to said housing; at least one pressure gauge mounted on said at least one tension rod for measuring the force between said screw and said feed roller applied by said fed material; control means connected to said at least one pressure gauge, and means for applying a force to said stripper blade connected to said control means whereby the force applied to said stripper blade is dependent upon said measured force such that the net force directing said stripper blade towards said feed roller remains constant.

By constantly measuring the force exerted by the fed material which tends to force the screw and the feed roller away from one another and, in dependence upon the measured values, applying a force to the stripper blade directed towards the feed roller surface such that the net force with which the blade is directed towards such surface is constant, certain advantages are attained.

Firstly, the stripper blade is pressed towards the feed roller surface at a constant net force which is independent of the pressure of the fed material, such as rubber in the feed section of the extruder. In consequence, the gap between the stripper blade and the feed roller does not need to be mechanically adjusted, as is the case with a fixed blade. Secondly, the wear on the stripper blade is drastically reduced. Thirdly, the amount of waste rubber emerging from the feed roller end of the extruder is minimal and, fourthly, there is no need for an operator to readjust, manually, the stripper blade.

The force applied by the material, which is measured by the pressure gauge, is advantageously determined as a value, and a correspondingly lower opposing force is transmitted to the stripper blade.

In a preferred embodiment, this opposing force is transmitted to the pressure end of a hydraulic piston and cylinder arrangement which causes axial movement of the stripper blade. The stripper blade is thus forced against the surface of the feeding roller at a constant net force and the gap between the blade and the feed roller surface is reduced to a minimal size.

The pressure acting on the hydraulic cylinder may advantageously be controlled by a proportional response valve or by a suitably programmed control apparatus. It is important that, to compensate constantly for changes in the measured force exerted by the material which acts proportionally on the surface of the stripper blade, the proportional response valve or programmed control apparatus transmits an opposing force to the means for driving the stripper blade. These drive means ensure that the blade is constantly directed against the surface of the stripper blade at a constant net force.

In advantageous embodiments of the present invention, the means for applying the opposing force to the stripper blade may be hydraulic or pneumatic piston and cylinder arrangements, a spindle drive assembly or actuatable electromagnets.

BRIEF DESCRIPTION OF THE DRAWINGS

Various embodiments of an apparatus in accordance with the present invention which are particularly suitable for carrying out the method of the present invention will be further described, by way of example, with reference to the accompanying drawings, in which.

DESCRIPTION OF PREFERRED EMBODIMENTS

Figure 1:
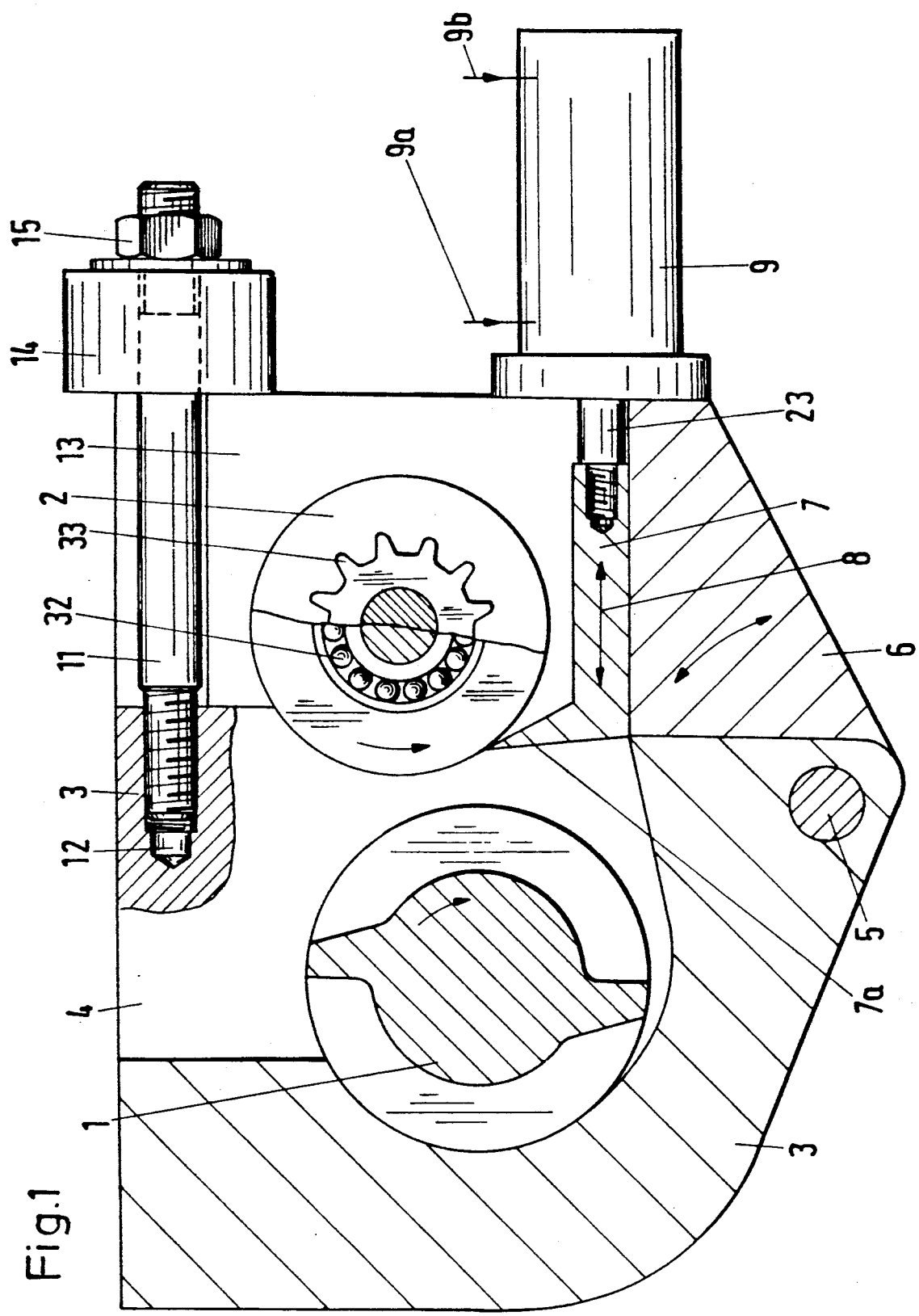
FIG. 1 is a cross-sectional view through the feed section of an extrusion device, the device including a stripper blade which is hydraulically adjustable.
Figure 2:
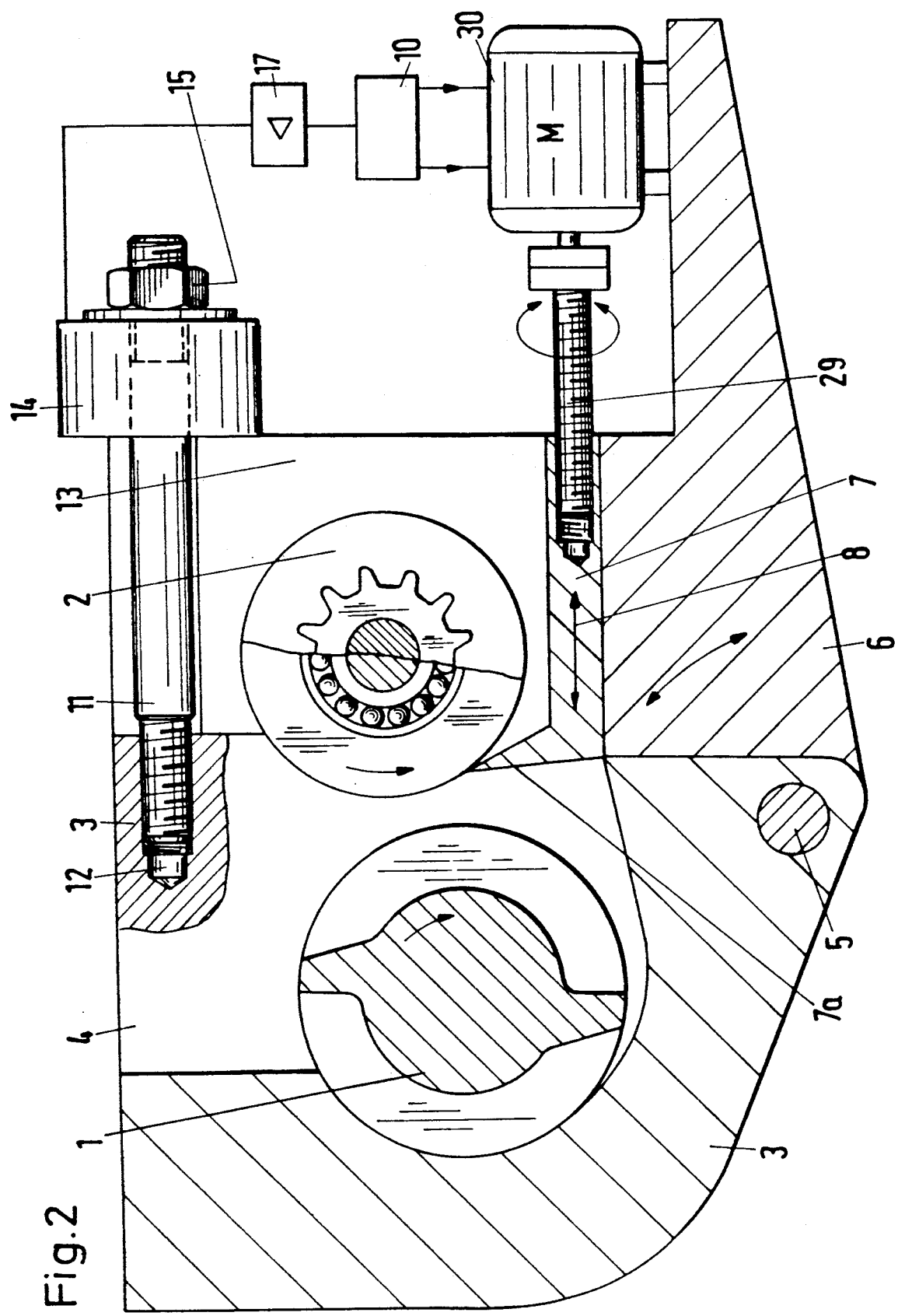
FIG. 2 is a cross-sectional view of an extrusion device similar to that shown in FIG. 1 but which is modified in that the scraper blade adjustment is effected by means of a spindle drive.
Figure 3:
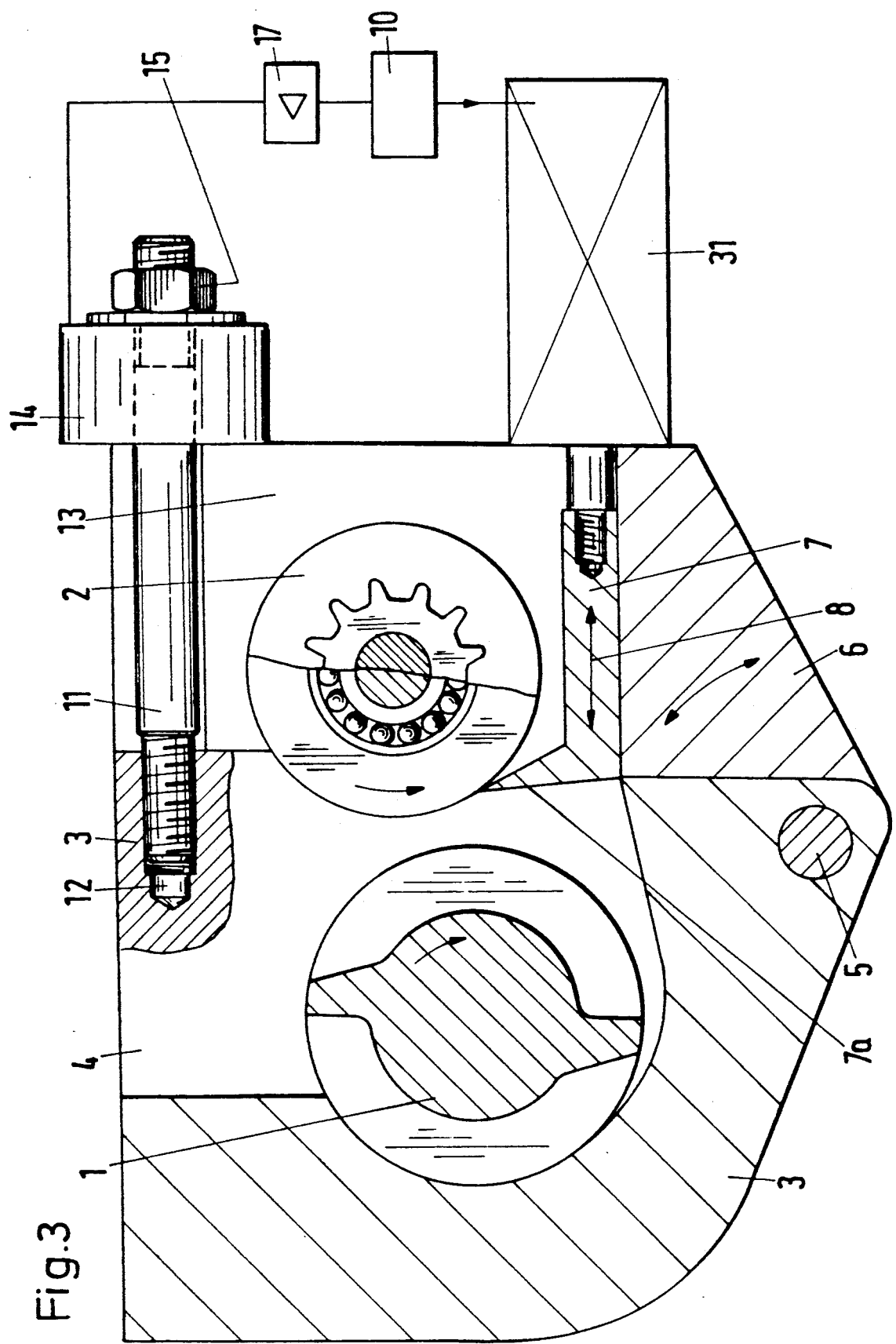
FIG. 3 is a cross-sectional view of a further embodiment of an extrusion device similar to that shown in FIG. 1, modified in that the blade adjustment is effected magnetically.

In FIGS. 1 to 3, there is shown an extrusion device which comprises an extruder screw 1 mounted for rotation in an extruder housing 3 shown in cross-section. The screw 1 cooperates with a feed roller 2 in a feed section of the device. A material inlet aperture 4 is disposed above the screw 1.

The feed roller 2 is journalled for rotation in a bearing 32 in a feed roller housing 6. The housing 6 is connected to the extruder housing 3 by means of a pivot 5. The feed roller 2 is driven by a drive means (not shown) which cooperates with a drive pinion 33 on the roller 2.

A recess is provided in the housing 6 beneath the feed roller 2 which accommodates a stripper blade 7. The blade 7 is displaceable towards the surface of the roller 2, in the direction of the double-headed arrow 8, by means of a hydraulic piston and cylinder arrangement 9. This permits the spacing between the surface of the feed roller 2 and the point of the stripper blade to be set.

In the upper portion of the extruder housing 3, a bore 12 is formed into which a tension or tie-rod 11 is screw-threadedly connected. The tension rod 11 connects a receiver arrangement 13 for the feed roller 2 to the upper portion of the extruder housing 3. A pressure gauge 14 is retained on the tension or tie-rod 11 by means of a nut 15.

Instead of the hydraulic piston and cylinder arrangement, which will be described in greater detail hereinafter, other means of maintaining the desired spacing between the feed roller 2 and the stripper blade 7 may be utilized. Thus FIG. 2 shows an extrusion device in which a spindle drive assembly is used. The assembly comprises a spindle 29 driven by a motor 30. This is used to maintain the parallel spacing between the stripper blade and the surface of the feed roller 2.

The separation force between the screw 1 and the roller 2 by the material being fed is measured by the pressure gauge 14. This force is determined by an amplifier 17 and is transmitted to a control device 10.

As a result, the control apparatus 10 actuates the motor 30. The motor 30 produces a torque, which drives the stripper blade 7 at a constant force, for example, 10 kN, towards the surface of the feed roller 2 through the intermediary of the spindle 29.

If the force between the roller 2 and the screw 1 becomes increased to, for example, 70 kN, the force of the blade acting on the feed roller would normally also increase. To prevent this, the control device acts on the motor to cause it to change the torque direction, whereby the net force between the blade and the roller 2 is maintained at the constant value of 10 kN through the intermediary of the spindle drive assembly. By maintaining the net value constant, the gap between the blade 7 and the roller 2 is maintained constant.

FIG. 3 illustrates a further embodiment in which an electromagnet 31 is used to maintain the constant force between the blade 7 and the roller 2 in the direction of the roller 2. The electromagnet 31 is constantly controlled by the control device 10. The stripper blade 7 is connected to the magnet 31 and the control is effected so that the blade is constantly driven towards the feed roller 2 at a uniform force of 10 kN. If the separation force between the screw 1 and the roller 2 becomes increased to, say, 70 kN, a corresponding opposing force is applied by the electromagnet, so that the net force between the blade and the roller is maintained at a constant value of 10 kN.

Figure 4:
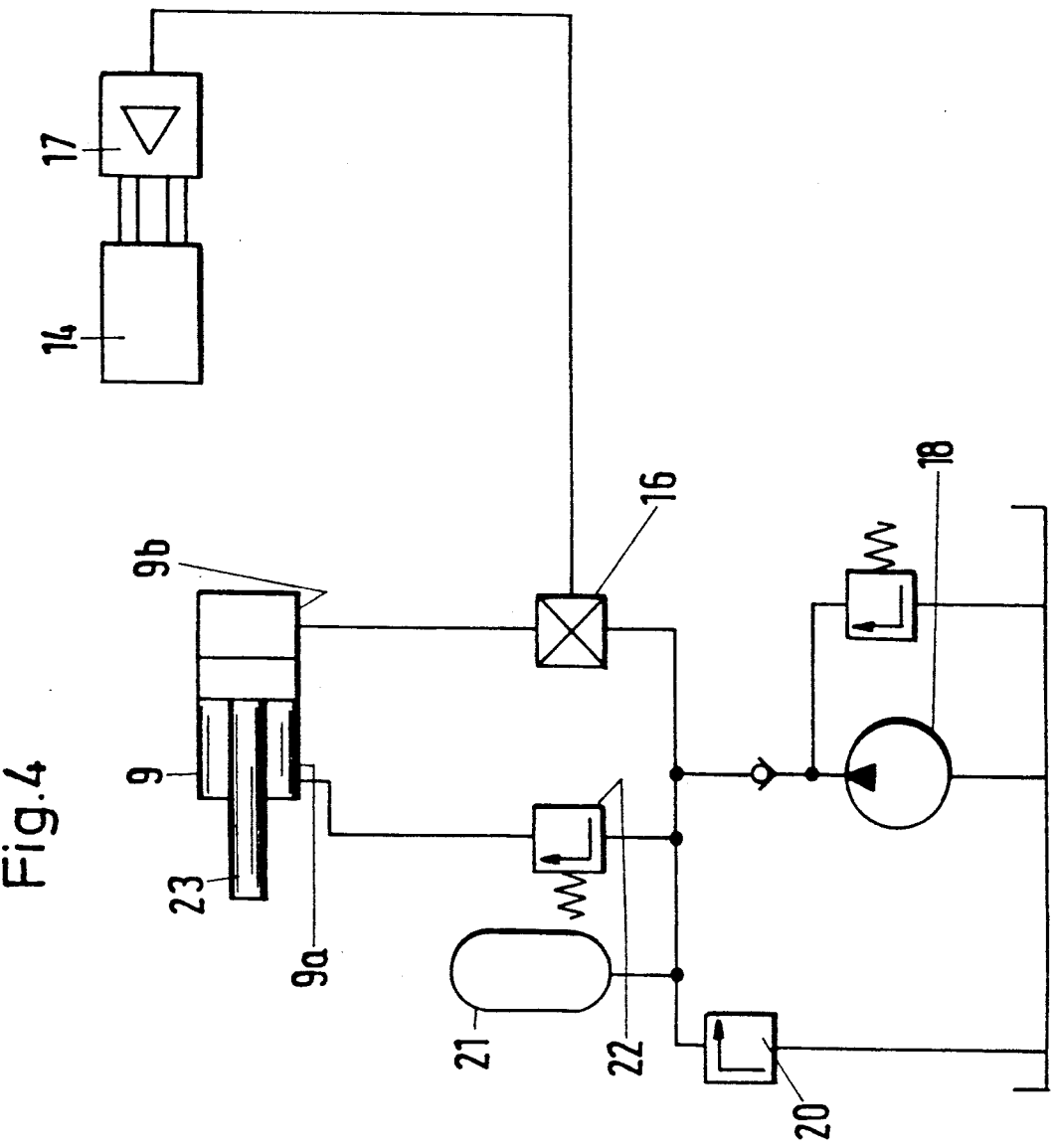
FIG. 4 is a schematic block diagram of one embodiment of a hydraulic circuit which could be utilised in the embodiment shown in FIG. 1.

FIG. 4 shows a block diagram of a hydraulic arrangement such as that shown in FIG. 1 and illustrates the mode of operation of the apparatus for maintaining the net pressure of the blade 7 acting on the feed roller constant, that is to say, for maintaining the gap between the blade 7 and the feed roller constant.

If, for example, rubber is fed into the extruder between the screw 1 and the feed roller 2, a separation force develops in the gap between the screw 1 and the roller 2. This force is measured by the pressure gauge 14 disposed on the tension rod 11.

The separation force between the screw 1 and the feed roller 2, which latter is mounted in the receiver arrangement 13 so as to be displaceable through the intermediary of the pivot 5, is amplified by an electrical amplifier 17 and is transmitted to a proportional response valve 16 for controlling the hydraulic piston and cylinder arrangement 9. A hydraulic pump 18 produces a hydraulic pressure, which is reduced by means of a pressure relief valve 20 and is transmitted to a storage unit 21.

A constant pressure of 20 bar, for example, is then transmitted to the end of the piston rod 23 of the hydraulic arrangement 9 from the storage unit 21, which has, for example, a pressure of 300 bar, through the intermediary of a pressure relief valve 22.

The piston rod 23 of the hydraulic arrangement 9 is connected to the stripper blade 10, as is shown in FIG. 1. As a result of loading the conduit connection 9a of the hydraulic cylinder with the desired pressure of 20 bar, it is possible to ensure that the stripper blade is constantly pressed or drawn towards the feed roller surface at a pressure of exactly 20 bar.

If a proportion of the material pressure of, for example 200 bar, is effective between the extrusion screw 1 and the feed roller 2 and is transmitted to the surface 7a of the stripper blade 7, an opposing hydraulic pressure is transmitted to a further conduit connection 9b of the hydraulic cylinder 9. This pressure corresponds to a rubber pressure of, for example, 180 bar (acting on the stripper blade), so that the stripper blade is still pressed against the feed roller surface at a constant net pressure of 20 bar. In the event of the measured gap force between the screw 1 and the roller 2, that is to say the rubber pressure increasing, the opposing hydraulic pressure acting on the conduit connection 9b in the hydraulic cylinder 9 is also increased accordingly.

Since the measured separation or gap force between the screw and the feed roller is proportional to the force which acts upon the surface 7a of the stripper blade, the pressure of the hydraulic arrangement 9 is also proportionally controlled by the valve 16.

Figure 5:
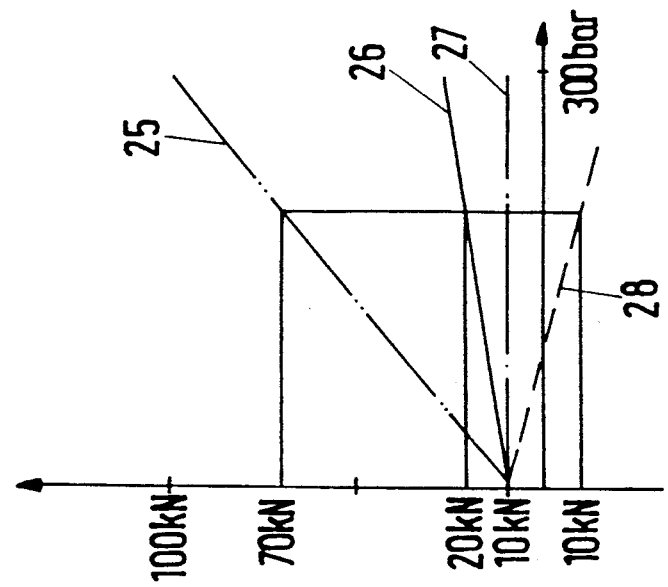
FIG. 5 is a graphical representation of the forces which are produced in an extrusion device.

The graphical representation of FIG. 5 shows proportional pressure ratios. The material force, which acts on the feed roller as a result of the introduction of the rubber, for example, 70 kN, is illustrated by the line 25.

The force acting on the blade surface 7a is correspondingly smaller and is illustrated by the line 26, and shows a force of, for example, 20 kN. An opposing force (line 28) is transmitted to the stripper blade by means of the hydraulic arrangement 9, so that a constant force between the blade and roller of, for example 10 kN, is produced. The constant force, in this example, of 10 kN, is illustrated by the line 27.

It is apparent from the graphical representation that, as a result of the teaching according to the invention, the force of the stripper blade 7 acting on the feeding roller 2 is kept constant for all pressure and force circumstances which occur between the screw and the feed roller even though these latter are constantly changing.

I claim:

1. A method of maintaining constant the force applied by a stripper blade against an adjacently disposed feed roller of an extrusion device comprising a barrel and an extrusion screw mounted for rotation within said barrel, said barrel defining a feed section into which material to be extruded is fed, and said feed section comprising receiver means pivotally connected to said barrel and communicating therewith; a feed roller mounted for rotation within said receiver means, a stripper blade directed towards but spaced from said feed roller for removing said material from said feed roller and for directing said material into said barrel for extrusion by said screw, said feed roller cooperating with said extruder screw, and means for measuring the pressure exerted in said barrel by said feed material, said method comprising the steps of:

a) measuring the force generated by said fed material tending to force said screw away from said feed roller means, and b) applying a force to said stripper blade responsive to and in dependence upon said measured force such that the net force directing said stripper blade towards said feed roller means remains constant.

2. The method as recited in claim 1, wherein said extrusion device further includes hydraulic piston and cylinder means operatively connected to said stripper blade, and control means operatively connected to both said hydraulic piston and cylinder means and said pressure measuring means, and wherein said application of said constant net force to said stripper blade comprises the further steps of:

a) transmitting said measured value from said measuring means to said control means, and b) actuating said hydraulic piston and cylinder means by said control means in dependence upon said measured value, said piston and cylinder means applying a pressure to said scraper blade in dependence upon said measured value.

3. The method as recited in claim 2, wherein said control means operatively connected to both said hydraulic piston and cylinder means and said pressure measuring means include a proportional response valve, and wherein said application of said constant net force to said stripper blade comprises the steps of transmitting said measured value from said measuring means to said control means, said control means actuating said hydraulic piston and cylinder means in dependence upon said measured value to apply through said proportional response valve a pressure to said stripper blade such that the net force directing said stripper blade towards said feed roller remains constant.

4. An extrusion device comprising:

a) a housing defining a feed section into which material to be extruded is fed;

b) screw means mounted for rotation within said housing;

c) receiver means in said feed section pivotally connected to said housing and communicating therewith;

d) a feed roller mounted for rotation within said receiver means and cooperating with said screw means;

e) a stripper blade directed towards said feed roller but spaced therefrom for removing said material from said feed roller and for directing said material into said housing;

f) means for measuring the force exerted by said fed material within said housing, said force measuring means comprising at least one tension rod connecting said receiver means to said housing; and at least one pressure gauge mounted on said at least one tension rod for measuring the force between said screw means and said feed roller;

g) control means connected to said at least one pressure gauge, and h) means connected to and controlled by said control means for applying a force to said stripper blade, the force applied to said stripper blade though said control means being dependent upon said measured force so that the net force directing said stripper blade towards said feed roller remains constant.

5. An extrusion device as recited in claim 4, wherein said control means comprises a proportional response valve.

6. An apparatus as recited in claim 4, wherein means for applying a force to said stripper blade comprises a hydraulic piston and cylinder arrangement.

7. An apparatus as recited in claim 4, wherein said means for applying a force to said stripper blade comprises a spindle, and means for driving said spindle.

8. An apparatus as recited in claim 4, wherein said means for applying a force to said stripper blade comprises a pneumatic piston and cylinder arrangement.

9. An apparatus as recited in claim 4, wherein said means for applying a force to said stripper blade comprises an electromagnet device.

10. An extrusion device as recited in claim 4, wherein said receiver means comprises a bracket pivotably connected to said housing of said extrusion device, said extrusion device further comprising bearing means rotatably mounting said feed roller, and drive pinion means operatively connected to said feed roller, wherein said bracket accommodates said feed roller, said bearing means and said drive pinion means.

* * * * *